(12) United States Patent
Chen

(10) Patent No.: US 8,195,870 B2
(45) Date of Patent: Jun. 5, 2012

(54) MEMORY CARD AND METHOD FOR HANDLING DATA UPDATING OF A FLASH MEMORY

(75) Inventor: Chia-Hsin Chen, Taichung (TW)

(73) Assignee: Silicon Motion, Inc., Jhubei (TW)

( * ) Notice: Subject to any disclaimer, the term of this patent is extended or adjusted under 35 U.S.C. 154(b) by 908 days.

(21) Appl. No.: 12/050,205

(22) Filed: Mar. 18, 2008

(65) Prior Publication Data

US 2009/0144488 A1 Jun. 4, 2009

Related U.S. Application Data

(60) Provisional application No. 60/990,926, filed on Nov. 29, 2007.

(51) Int. Cl.
*G06F 12/00* (2006.01)
(52) U.S. Cl. .................... 711/103; 711/202; 711/205
(58) Field of Classification Search .................. 711/103, 711/202, 205
See application file for complete search history.

(56) References Cited

U.S. PATENT DOCUMENTS

2006/0004947 A1* 1/2006 Yin ............................. 711/100
2007/0136542 A1* 6/2007 Rudelic ...................... 711/163

FOREIGN PATENT DOCUMENTS

CN 1617109 5/2005

OTHER PUBLICATIONS

English language translation of abstract of CN 1617109 (published May 18, 2005).

* cited by examiner

*Primary Examiner* — Midys Rojas
(74) *Attorney, Agent, or Firm* — Ditthavong Mori & Steiner, P.C.

(57) ABSTRACT

The invention provides a method for handling data updating of a flash memory. In one embodiment, the flash memory comprises a mother block comprising a plurality of updated pages to be updated. First, a spare block, recording no data, is popped as a file allocation table (FAT) block corresponding to the mother block. Data for updating the updated pages of the mother block is then written to a plurality of replacing pages of the FAT block. Finally, a plurality of mapping relationships between the replacing pages and the updated pages are recorded in a page mapping table stored in the FAT block.

17 Claims, 6 Drawing Sheets

400

| Indexes of pages of a mother block | 0 | 1 | 2 | 3 | 4 | 5 | 6 | ... | N |
|---|---|---|---|---|---|---|---|---|---|
| Indexes of corresponding replacing pages of an FAT block | 0 | 1 | | | | | | ... | |

| Indexes of pages of a mother block | 0 | 1 | 2 | 3 | 4 | 5 | 6 | ... | N |
|---|---|---|---|---|---|---|---|---|---|
| Indexes of corresponding replacing pages of an FAT block | 0 | 1 | | 3 | 4 | 5 | | ... | |

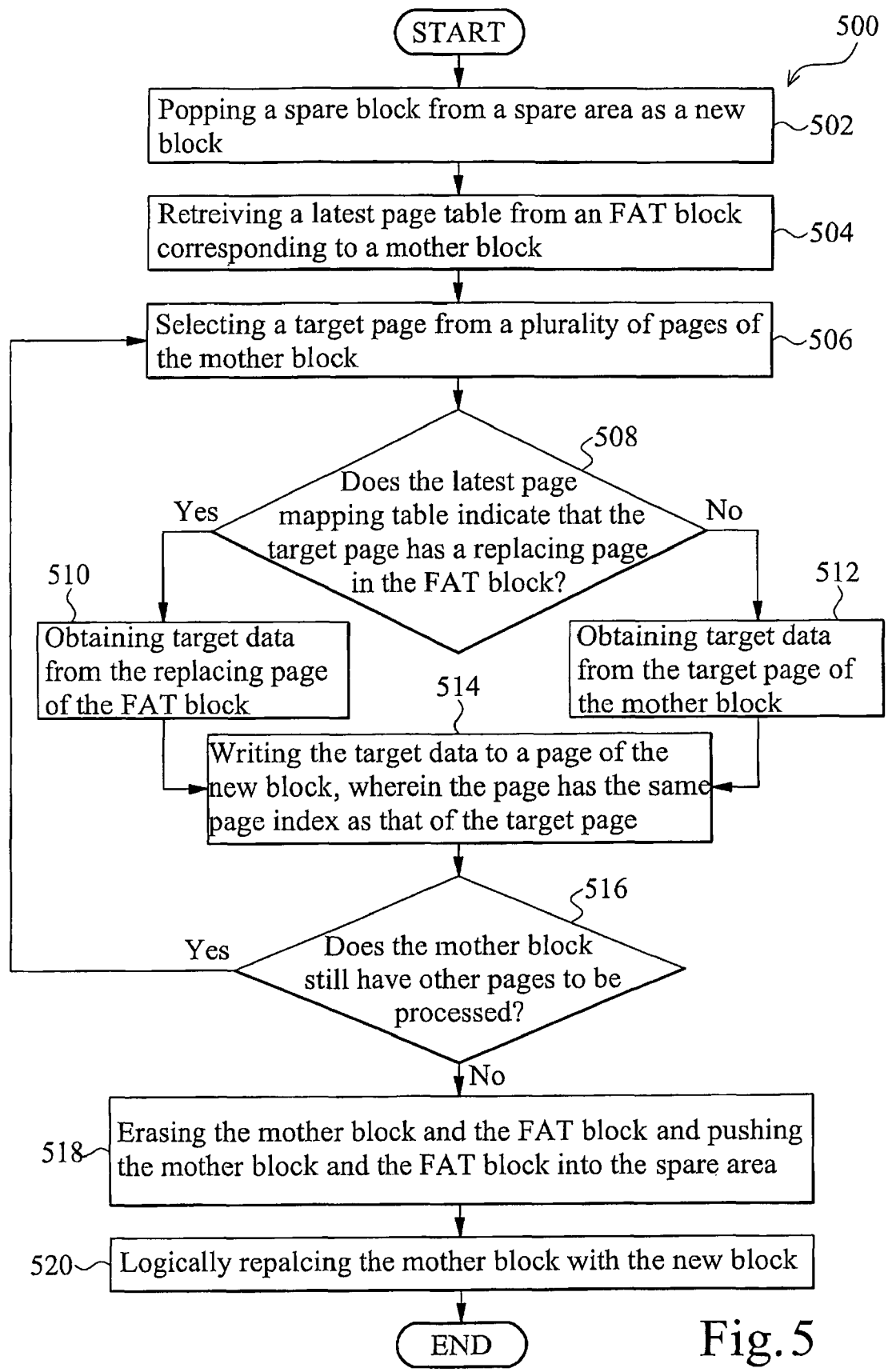

MEMORY CARD AND METHOD FOR HANDLING DATA UPDATING OF A FLASH MEMORY

CROSS REFERENCE TO RELATED APPLICATIONS

This application claims the benefit of U.S. Provisional Application No. 60/990,926, filed on Nov. 29, 2007.

BACKGROUND OF THE INVENTION

1. Field of the Invention

The invention relates to flash memories, and more particularly to data updating of flash memories.

2. Description of the Related Art

A flash memory is a non-volatile memory that can be electrically erased and reprogrammed. Flash memories are primarily used in memory cards and USB flash drives for general storage and transfer of data between computers and other digital products. Flash memory costs far less than EEPROM and therefore has become a dominant memory device. Examples of applications include Personal Digital Assistants (PDA) and laptop computers, digital audio players, digital cameras and mobile phones.

A flash memory comprises a large number of blocks, and each block comprises a plurality of pages for storing data. A flash memory is erased by a unit of a block and programmed by a unit of a page. In other words, when data of the flash memory is erased, all pages of a block of the memory must be erased together. When data is written to a flash memory, the data, however, can be written to a specific page of a block of the flash memory. In addition, data can only be written to a page where no data is stored or a page which has been erased. During flash memory operation, because a flash memory cannot be erased in a unit of a page, when only some pages of a block which has stored data therein is required to be updated with new data, the new data cannot be directly written to the updated pages, and a flash memory controller must specifically handle data updating of the flash memory. Thus, a novel method for handling data updating of a flash memory is therefore required.

BRIEF SUMMARY OF THE INVENTION

The invention provides a method for handling data updating of a flash memory. In one embodiment, the flash memory comprises a mother block comprising a plurality of updated pages to be updated. First, a spare block, recording no data, is popped as a file allocation table (FAT) block corresponding to the mother block. Data for updating the updated pages of the mother block is then written to a plurality of replacing pages of the FAT block. Finally, a plurality of mapping relationships between the replacing pages and the updated pages are recorded in a page mapping table stored in the FAT block.

The invention provides a memory card. In one embodiment, the memory card comprises a flash memory and a controller. The flash memory comprises a mother block and a file allocation table (FAT) block, wherein the mother block comprises a plurality of updated pages to be updated, and the FAT block records no data. The controller writes data for updating the updated pages of the mother block to a plurality of replacing pages of the FAT block, and records a plurality of mapping relationships between the replacing pages and the updated pages in a page mapping table stored in the FAT block.

The invention provides a method for handling data updating of a flash memory. In one embodiment, the flash memory comprises a mother block and a file allocation table (FAT) block, the FAT block comprises a plurality of replacing pages storing new data of a plurality of updated pages of the mother block, and a page mapping table recording a plurality of mapping relationships between the updated pages and the replacing pages is stored in the FAT block. First, a spare block, recording no data, is popped from a spare area. Data stored in the mother block is then combined with new data stored in the replacing pages of the FAT block to obtain data written to the spare block according to the page mapping table. The mother block and the FAT block are then erased. Finally, the mother block is replaced with the spare block.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 4A shows an embodiment of a page mapping table according to the invention;

FIG. 4B shows another embodiment of a page mapping table according to the invention;

FIG. 5 is a flowchart of a method for integrating a mother block and an FAT block into a new block according to the invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
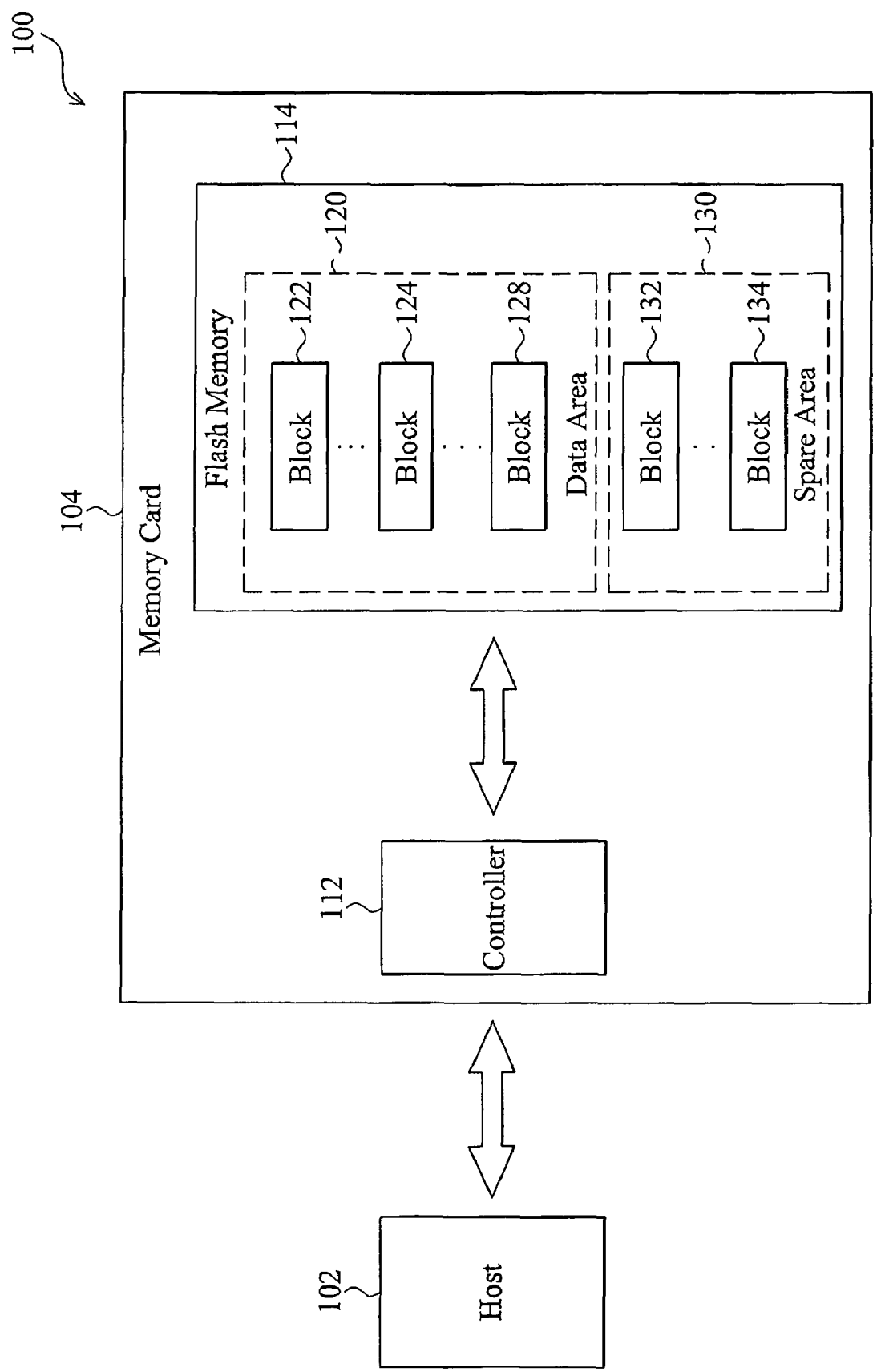
FIG. 1 is a block diagram of a system with a flash memory card according to the invention.

Referring to FIG. 1, a block diagram of a system 100 according to the invention is shown. The system 100 comprises a host 102 and a memory card 104. The memory card 104 comprises a controller 112 and a flash memory 114. In one embodiment, the flash memory is a NAND flash memory. The flash memory 114 comprises a plurality of blocks, each comprising a plurality of pages. Among the blocks of the flash memory 114, blocks storing data, such as the blocks 122~128, logically belong to a data area 120, and blocks storing no data, such as the blocks 132~134, logically belong to a spare area 130.

The flash memory 114 is programmed in a unit of a page. When a few specific pages of a block store no data, the controller 112 can therefore write data to the specific pages of the block. The flash memory 114 is erased in a unit of a block. Once a page of block needs erasion, the controller 112 must erase all pages of the block together.

Figure 2:
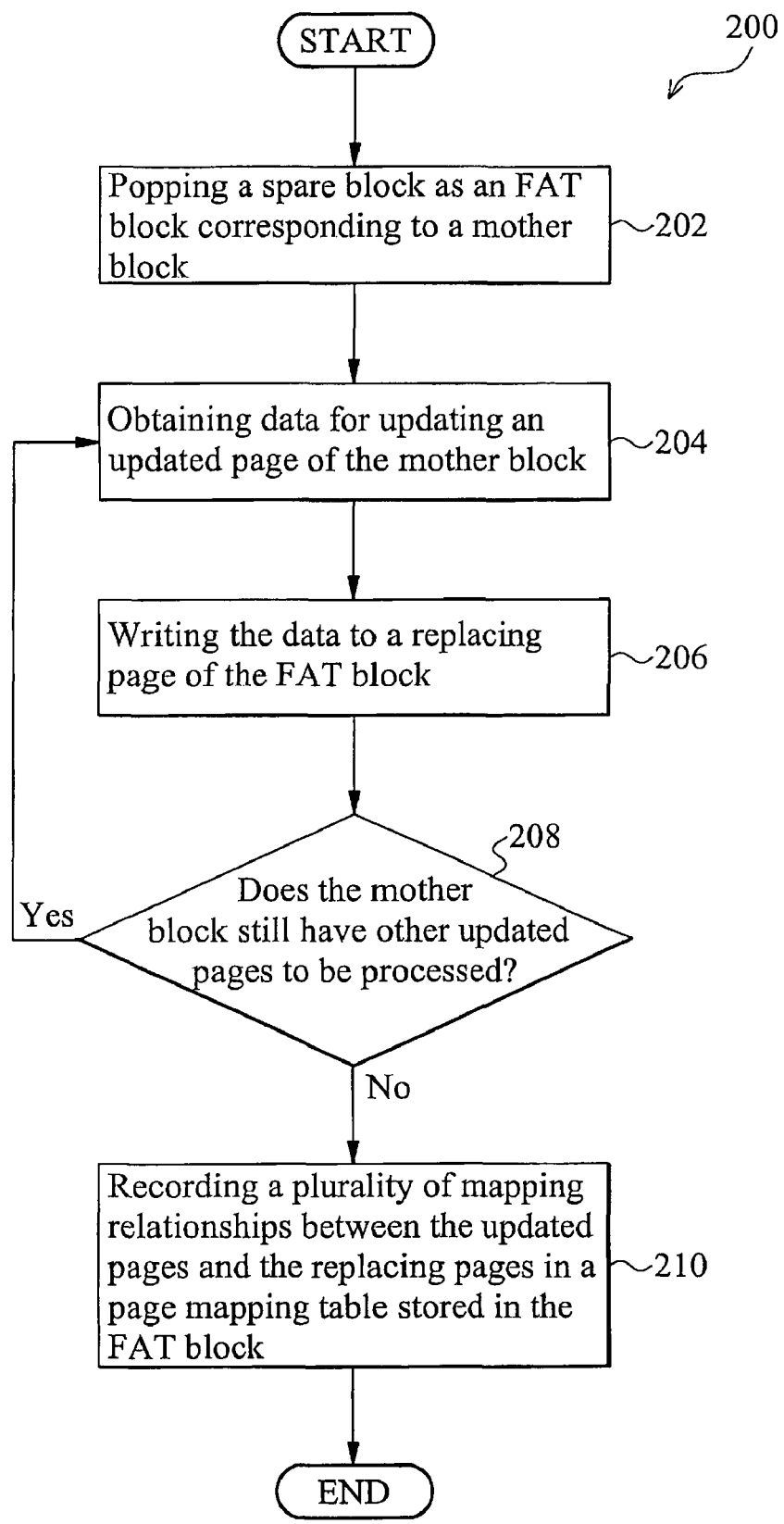
FIG. 2 is a flowchart of a method for handling data updating of a flash memory according to the invention.

Because the controller 112 can only write data to pages storing no data, when the host 102 must update data of pages which have stored data, the controller 112 must handle data updating according to a specially devised method. Referring to FIG. 2, a flowchart of a method 200 for handling data updating of a flash memory according to the invention is shown. Assume that the host 102 requests the controller 112 for updating a few pages of a mother block and delivers updating data of the pages to the controller 112. The pages of the mother block to be updated, however, may already have stored data therein and the controller 112 would not be able to directly write data to the updated pages of the mother block. The controller 112 then performs data updating according to the method 200.

Figure 3:
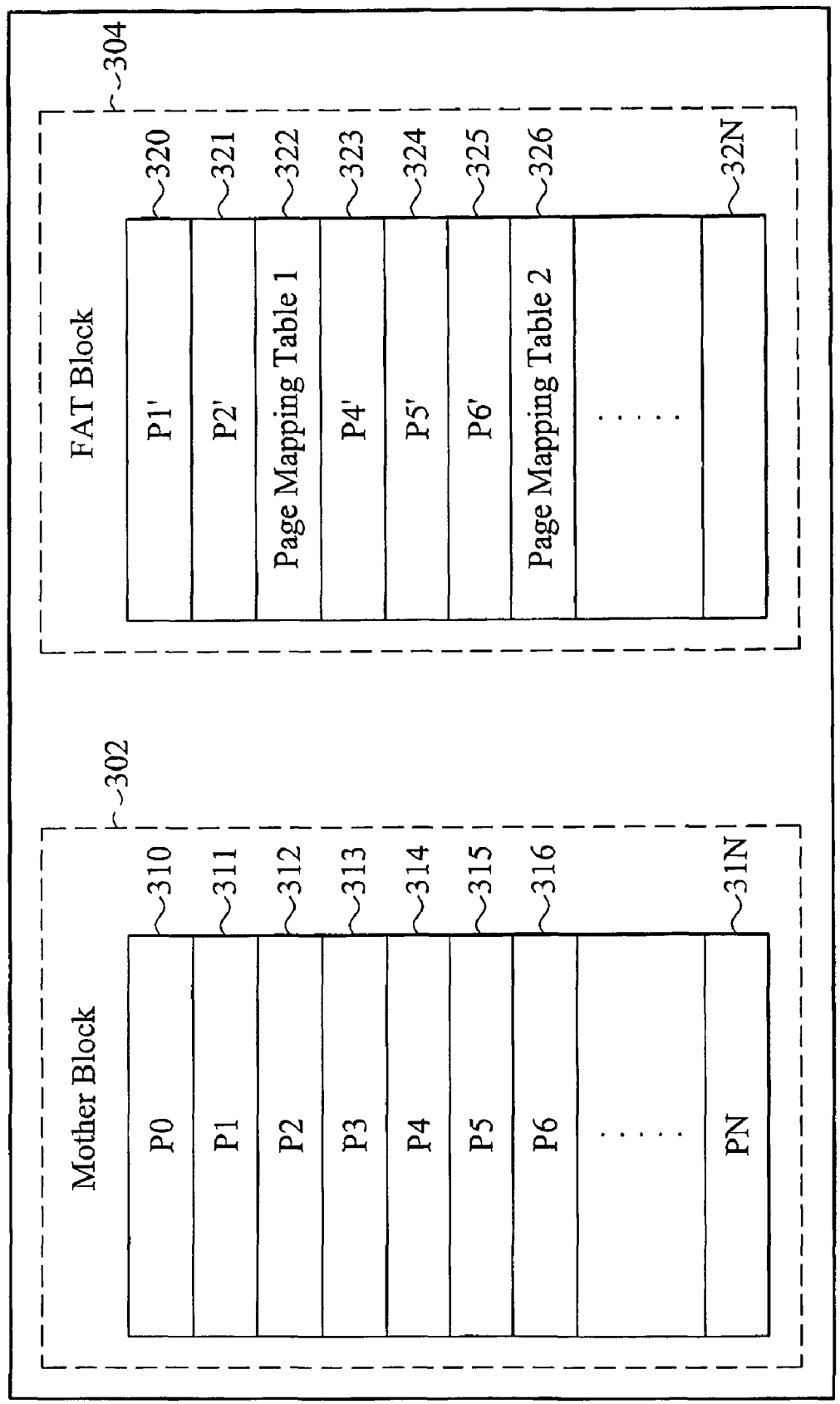
FIG. 3 shows an example of a mother block and a corresponding FAT block according to the invention.

First, the controller 112 selects/pops a spare block, storing no data, from the spare area 130 (step 202). The spare block is referred to as a file allocation table (FAT) block corresponding to the mother block to be updated. Referring to FIG. 3, a schematic diagram of a mother block 302 and a corresponding FAT block 304 is shown. The mother block 302 comprises a plurality of pages 310~31N, and the pages 310~31N respectively store data P0~PN. The FAT block 304 comprises a plurality of pages 320~32N. Because the FAT block 304 is a spare block, the pages 320~32N of the FAT block 304 store no data during this time.

Assume that the host 102 requests the controller 112 to update pages 311 and 312 of the mother block 302. The controller 112 then obtains data P1' for updating the updated page 311 (step 204). The controller 112 then selects a replacing page 320 from the pages of the FAT block 304 for storing the new data P1' of the updated page 310 and then writes the data P1' to the replacing page 320 of the FAT block 304 (step 206). Because the mother block 302 still has another page 312 to be updated, the controller 112 then obtains data P2' for updating the page 312 (step 204), then selects a replacing page 321 from the pages of the FAT block 304, and then writes the data P2' to the replacing page 321 of the FAT block 304 (step 206). Thus, the new data of both the updated pages 311 and 312 have been stored in the corresponding replacing pages 320 and 321 of the FAT block 304.

Because the new data of updated pages 310 and 311 of the mother block 302 have been stored in the replacing pages 320 and 321 of the FAT block 304, the controller 112 must then store mapping relationships between the replacing pages and the updated pages in a page mapping table (step 210). Referring to FIG. 4A, an embodiment of a page mapping table 400 according to the invention is shown. A first row 410 refers to indexes of pages of the mother block 302, wherein the indexes of the pages ranges from 0~N. A second row 420 stores indexes of replacing pages, corresponding to the updated pages, of the FAT block 304. The controller 112 can therefore determine whether a page of a mother block is an updated page and where a replacing page corresponding to the updated page is located in the FAT block according to the page mapping table. For example, the page 311 with a page index 1 in the mother block 302 has a corresponding replacing page 320 with a page index 0 in the FAT block 304, and the page 312 with a page index 2 in the mother block 302 has a corresponding replacing page 321 with a page index 1 in the FAT block 304. Finally, the controller 112 writes the page table 400 into a page 322 of the FAT block 304, completing data updating.

When the host 102 requests the controller 112 again to update pages 314~316 of the mother block 302, the controller 112 retrieves the FAT block 304 corresponding to the mother block 302 and stores new data of the updated pages 314~316 to the FAT block 304 again. For example, when the host 102 request updating the pages 314~316 with new data P4', P5', and P6, the controller 112 determines pages 323~325 of the FAT block 304 as replacing pages of the updated pages 314~316 and then respectively stores new data P4', P5', and P6' to the replacing pages 323, 324, and 325 according to steps 204~208 of method 200. The controller 112 then records the mapping relationships between all the updated pages of the mother block 302 and all the replacing pages of the FAT block 304 in a page mapping table 450 shown in FIG. 4B and then writes the page mapping table 450 to a page 326 of the FAT block 304, completing data updating.

When the host 102 requests the controller 112 to read the mother block 302, the controller 112 must first find the FAT block 304 corresponding to the mother block 302, and retrieve the latest page mapping table 450 from the page 326 of the FAT block 304. The controller 112 then must determine whether a page of the mother block is an updated page having a corresponding replacing page in the FAT block 304 according to the page mapping table 450. Referring to FIG. 4B, only the pages 311, 312, 314, 315, and 316 with indexes 1, 2, 4, 5, and 6 have corresponding replacing pages, and the pages 311, 312, 314, 315, and 316 are therefore updated pages. When a page of the mother block 302 is not an updated page, the controller 112 directly reads the page to obtain output data. When a page of the mother block 302 is an updated page, the controller 112 finds a replacing page corresponding to the page according to the page mapping table 450 and reads the replacing page to obtain output data. Thus, the host 102 receives data P0, P1', P2', P3, P4', P5', P6', . . . , and PN from the controller 112 when the mother block 302 is read.

When an FAT block is maximized and has no room for storing new data, the controller 112 initiates a data integration process to integrate data of the mother block and updated data of the FAT block into a new block. Referring to FIG. 5, a flowchart of a method 500 for integrating a mother block and an FAT block into a new block according to the invention is shown. The controller 112 first selects/pops a spare block, storing no data from the spare area 130, as a new block (step 502). The controller 112 then retrieves a latest page mapping table from the FAT block (step 504). The controller then selects a target page from a plurality of pages of the mother block and determines whether the target page has a replacing page in the FAT block according to the page mapping table (step 508). If the page mapping table indicates that the target page has a replacing page in the FAT block, the target page is an updated page. Otherwise, the target page is not an updated page. For example, according to the page mapping table 450 shown in FIG. 4B, the pages 311, 312, 314, 315, and 316 of the mother block 302 respectively have replacing pages 320, 321, 323, 324, and 325 in the FAT block 304 and are updated pages.

Figure 6:
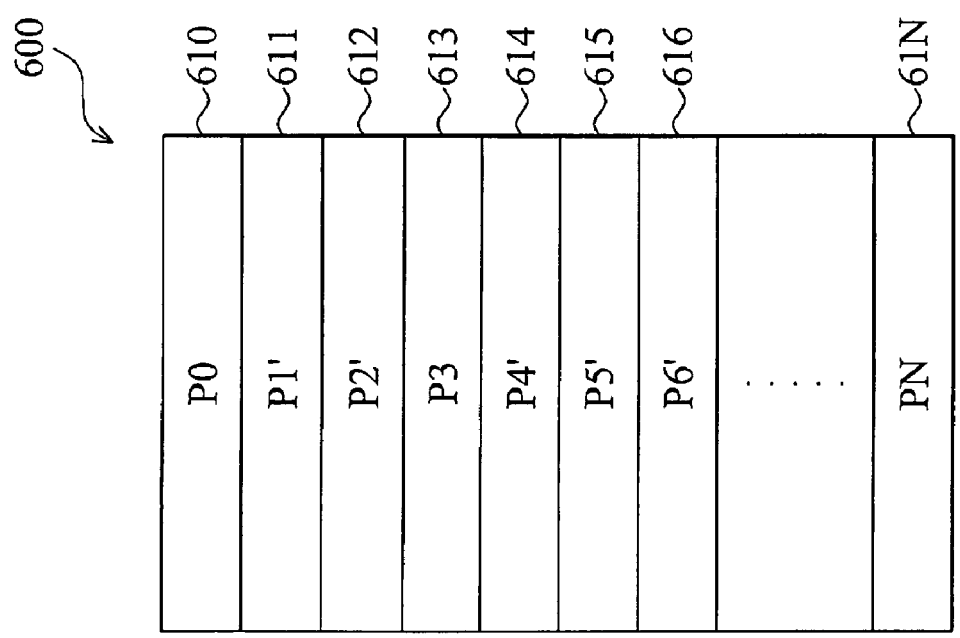
FIG. 6 shows an example of a new block storing integrated data of the mother block and the FAT block of FIG. 3.

When the target page is not an updated page, the controller 112 reads the target page to obtain target data (step 512). When the target page is an updated page, the controller 112 reads a replacing page of the target page to obtain target data (step 510). The controller 112 then writes the target data to a page of the spare block, wherein the page has the same index as that of the target page (step 514). Referring to FIG. 6, a new block 600 storing integrated data of the mother block 302 and the FAT block 304 of FIG. 3 is shown. When the target page is the page 313 which is not an updated page, the target data P3 stored in the page 313 is directly written to the page 613 of the new block 600. When the target page is the page 314 which is an updated page, the target data P4' stored in the replacing page 323 of the page 314 is written to the page 614 of the new block 600.

The steps 506~516 are repeated until all pages of the mother block are processed (step 516). After all pages of the mother block 302 are processed, a new block 600 storing combined data of the mother block 302 and the FAT block 304 is obtained. The mother block 302 and the FAT block 304 are therefore useless to the memory card 104. Thus, the controller 112 erases the mother block 302 and the FAT block 304 and pushes the mother block 302 and the FAT block 304 to the spare area 130. The mother block 302 and the FAT block 304 can therefore be reused to leave room for storing more data. Finally, the controller 112 logically replaces the mother block 302 with the new block 600 by remapping a logical address corresponding to the mother block to a physical address of the new block, completing the data integration process.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for handling data updating of a flash memory, wherein the flash memory comprises a mother block comprising a plurality of updated pages to be updated, and the method comprising:
    popping a spare block, recording no data, as a file allocation table (FAT) block corresponding to the mother block;
    writing data for updating the updated pages of the mother block to a plurality of replacing pages of the FAT block; and
    recording a plurality of mapping relationships between the replacing pages and the updated pages in a page mapping table stored in the FAT block.

2. The method as claimed in claim 1, wherein the writing step further comprises:
    obtaining target data for updating a target updated page selected from the updated pages;
    determining a target replacing page selected from the replacing pages; and
    writing the target data to the target replacing page.

3. The method as claimed in claim 2, further comprising:
    repeating obtaining of the target data to writing of the target data until all of the updated pages are processed.

4. The method as claimed in claim 2, wherein the recording step comprises:
    recording indexes of the target updated pages and indexes of the corresponding target replacing pages as the mapping relationships of the page mapping table; and
    writing the page mapping table to a page of the FAT block.

5. The method as claimed in claim 1, wherein the method further comprises when the mother block is read, reading the replacing pages of the FAT block instead of the updated pages of the mother block according to the page mapping table.

6. The method as claimed in claim 5, wherein the reading step further comprises:
    determining whether a target page of the mother block is one of the updated pages;
    when the target page is not one of the updated pages, directly reading the target page of the mother block to obtain data corresponding to the target page; and
    when the target page is one of the updated pages, determining a replacing page corresponding to the target page according to the page mapping table and reading the replacing page of the FAT block to obtain data corresponding to the target page.

7. A memory card, comprising:
    a flash memory, comprising a mother block and a file allocation table (FAT) block, wherein the mother block comprises a plurality of updated pages to be updated; and
    a controller, writing data for updating the updated pages of the mother block to a plurality of replacing pages of the FAT block, and recording a plurality of mapping relationships between the replacing pages and the updated pages in a page mapping table stored in the FAT block.

8. The memory card as claimed in claim 7, wherein the controller obtains target data for updating a target updated page selected from the updated pages, determines a target replacing page selected from the replacing pages, writes the target data to the target replacing page, and repeats obtaining of the target data to writing of the target data until all of the updated pages are processed, thus writing data for updating the updated pages of the mother block to the replacing pages of the FAT block.

9. The memory card as claimed in claim 8, wherein the controller records indexes of the target updated pages and indexes of the corresponding target replacing pages as the mapping relationships of the page mapping table, and writes the page mapping table to a page of the FAT block, thus recording the mapping relationships between the replacing pages and the updated pages in the page mapping table.

10. The memory card as claimed in claim 7, wherein when the mother block is read, the controller further reads the replacing pages of the FAT block instead of the updated pages of the mother block according to the page mapping table.

11. The memory card as claimed in claim 10, wherein when the mother block is read, the controller determines whether a target page of the mother block is one of the updated pages, the controller directly reads the target page of the mother block to obtain data corresponding to the target page if the target page is not one of the updated pages.

12. The memory card as claimed in claim 11, wherein the controller determines a replacing page corresponding to the target page according to the page mapping table and reads the replacing page of the FAT block to obtain data corresponding to the target page if the target page is one of the updated pages, thus reading the replacing pages of the FAT block instead of the updated pages.

13. A method for handling data updating of a flash memory, wherein the flash memory comprises a mother block and a file allocation table (FAT) block, the FAT block comprises a plurality of replacing pages storing new data corresponding to a plurality of updated pages of the mother block, and a page mapping table recording a plurality of mapping relationships between the updated pages and the replacing pages is stored in the FAT block, and the method comprising:
    popping a spare block, recording no data, from a spare area as a new block;
    combining data stored in the mother block with new data storing in the replacing pages of the FAT block to obtain data written to the new block according to the page mapping table; and
    erasing the mother block and the FAT block.

14. The method as claimed in claim 13, wherein the combining step comprises:
    determining whether a target page selected from pages of the mother block is one of the updated pages according to the page mapping table; and
    writing data of the target page to a specific page of the new block when the target page is not one of the updated pages, wherein the specific page has the same index as that of the target page.

15. The method as claimed in claim 14, wherein the combining step further comprises:
   writing data of a replacing page corresponding to the target page to the specific page of the new block when the target page is one of the updated pages; and
   repeating the determining step to writing of data of the replacing page until all pages of the mother block are processed.

16. The method as claimed in claim 13, wherein the method further comprises pushing the mother block and the FAT block into the spare area.

17. The method as claimed in claim 13, further comprising:
   replacing the mother block with the new block by remapping a logical address corresponding to the mother block to a physical address of the new block.

* * * * *